(12) United States Patent
Ishizawa et al.

(10) Patent No.: US 8,207,889 B2
(45) Date of Patent: Jun. 26, 2012

(54) DUAL POLARIZATION RADAR APPARATUS AND INTERFERENCE JUDGMENT METHOD

(75) Inventors: Hiroshi Ishizawa, Kawasaki (JP); Masakazu Wada, Kawasaki (JP); Fumihiko Mizutani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/825,697

(22) Filed: Jun. 29, 2010

(65) Prior Publication Data

US 2011/0063161 A1    Mar. 17, 2011

(30) Foreign Application Priority Data

Sep. 14, 2009 (JP) ................................. 2009-212191

(51) Int. Cl.
*G01S 13/00* (2006.01)
(52) U.S. Cl. ......................................... 342/159; 342/162
(58) Field of Classification Search ........... 342/159–164
See application file for complete search history.

(56) References Cited

U.S. PATENT DOCUMENTS

| 4,231,037 A | 10/1980 | Long |
| 4,490,719 A | 12/1984 | Botwin et al. |
| 2005/0093734 A1 * | 5/2005 | Alford et al. ................. 342/26 R |

FOREIGN PATENT DOCUMENTS

GB    2 285 718 A    7/1995

OTHER PUBLICATIONS

"Design Specifications of Weather Doppler Radar for Airport (Kagoshima Airport)", KiRe [transliterated] Jun. 2001, KiKan [transliterated], (Japan), Published by Japan Meteorological Agency, No. 20, May 2006, 32 pages.

European Search Report dated Mar. 22, 2012, in European Patent Application No. 10 16 7162.

\* cited by examiner

*Primary Examiner* — Timothy A Brainard
(74) *Attorney, Agent, or Firm* — Oblon, Spivak, McClelland, Maier & Neustadt, L.L.P.

(57) ABSTRACT

According to one embodiment, a dual polarization radar apparatus includes a received power calculation unit configured to calculate a horizontal polarization received power and a vertical polarization received power, the horizontal polarization received power indicating a power value of a horizontal polarization received signal reflected from an observation target, the vertical polarization received power indicating a power value of a vertical polarization received signal reflected from the observation target, a power ratio calculation unit configured to calculate a power ratio between the horizontal polarization received power and the vertical polarization received power, and an interference judgment unit configured to judge that an interference signal is mixed to the horizontal polarization received signal or the vertical polarization received signal when the power ratio is greater than a predetermined threshold value.

18 Claims, 3 Drawing Sheets

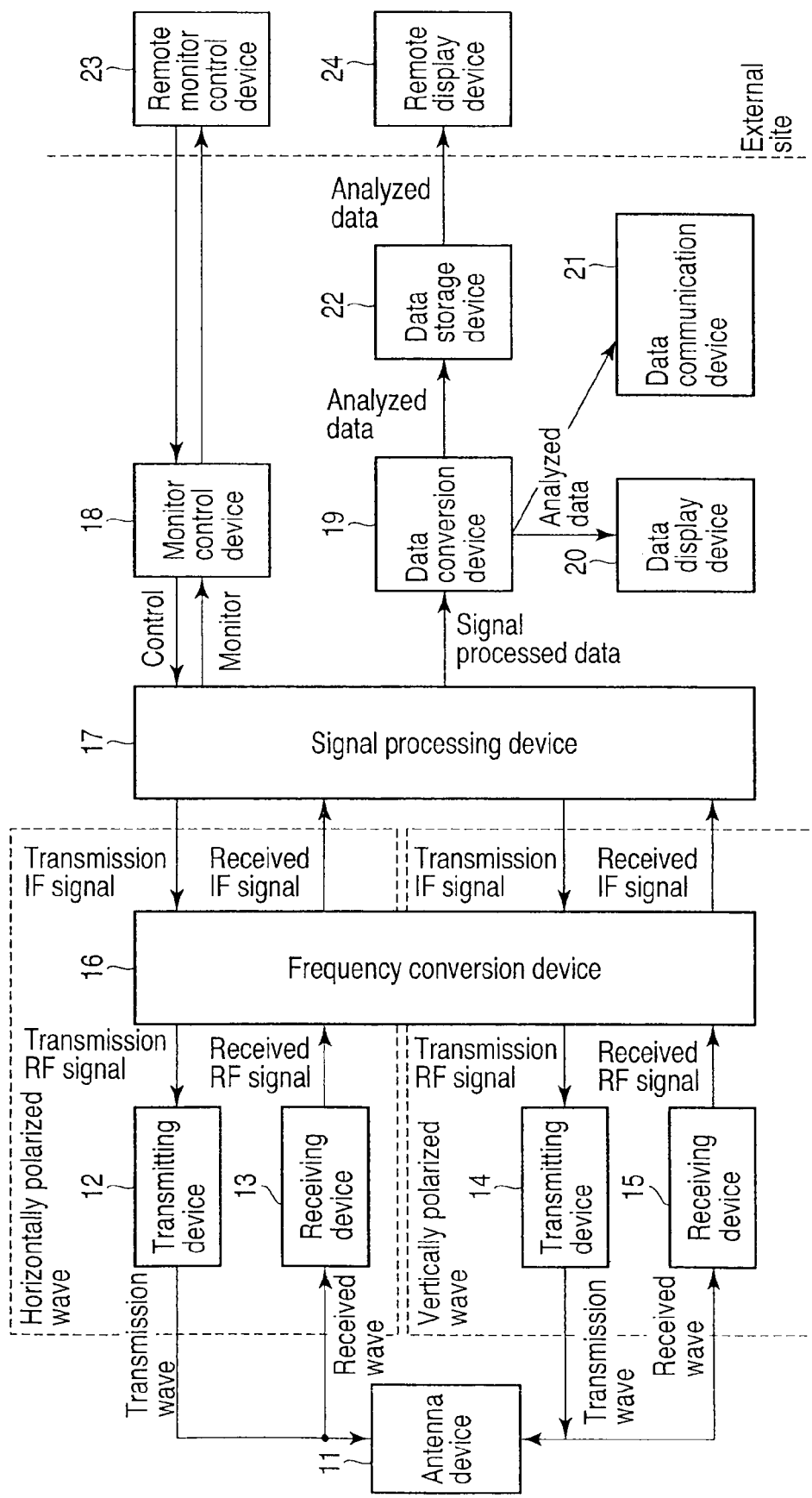
F I G. 1

DUAL POLARIZATION RADAR APPARATUS AND INTERFERENCE JUDGMENT METHOD

CROSS-REFERENCE TO RELATED APPLICATIONS

This application is based upon and claims the benefit of priority from Japanese Patent Application No. 2009-212191, filed Sep. 14, 2009; the entire contents of which are incorporated herein by reference.

FIELD

Embodiments described herein relate generally to a dual polarization radar apparatus and an interference judgment method.

BACKGROUND

Weather radars, for example, are used to detect the intensity of echoes reflected by precipitation particles of clouds, rain, and the like, and to observe or forecast the state of weather. Recently, in addition to radars that use only the conventional horizontally polarized waves, dual polarization radars have been used, which emit pulse waves of horizontally polarized waves and vertically polarized waves alternately, and observe the shape, size, and the like of an observation target based on difference in intensity of reflection from the observation target.

In the case of observation using radars, signals from other radar sites, for example, may be mixed into the received signals as interference waves. Further, multipath interference may occur and unnecessary signals may be mixed into the received signals. As a technique of removing such interference waves, "Metrological Agency, 'Doppler Radar for Airport Weather Manufacturing Specification (Kagoshima Airport)', May 2006, p. 19" discloses a technique of replacing IQ data judged as including interference waves with IQ data of a hit before.

BRIEF DESCRIPTION OF THE VIEWS OF THE DRAWING

FIG. 1 is a block diagram illustrating a configuration of a weather radar system using a dual polarization radar of an embodiment;

DETAILED DESCRIPTION

Figure 2:
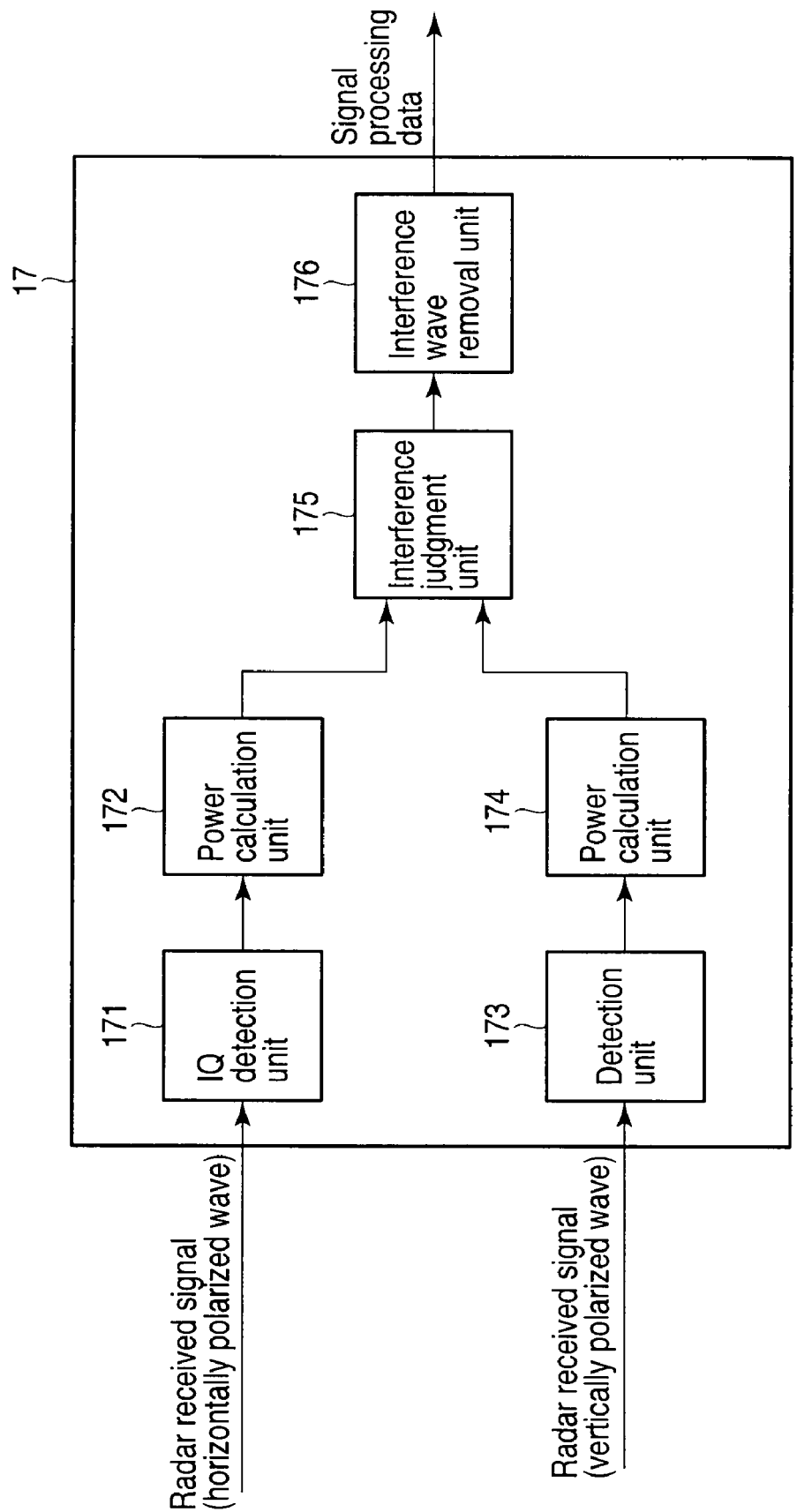
FIG. 2 is a block diagram illustrating a detailed configuration of a signal processing device.

In general, according to one embodiment, a dual polarization radar apparatus includes a received power calculation unit, a power ratio calculation unit, and an interference judgment unit. The received power calculation unit calculates a horizontal polarization received power and a vertical polarization received power, the horizontal polarization received power indicating a power value of a horizontal polarization received signal reflected from an observation target, the vertical polarization received power indicating a power value of a vertical polarization received signal reflected from the observation target. The power ratio calculation unit calculates a power ratio between the horizontal polarization received power and the vertical polarization received power. The interference judgment unit judges that an interference signal is mixed to the horizontal polarization received signal or the vertical polarization received signal when the power ratio is greater than a predetermined threshold value.

Hereinafter, embodiments will be described in detail with reference to the accompanying drawings.

FIG. 1 is a block diagram illustrating a configuration of a weather radar system using the dual polarization radar of the embodiment. According to the weather radar system, it is possible to observe the precipitation intensity, the Doppler velocity, and the shape and size of precipitation particles.

The system includes an antenna device 11, a transmitting device (horizontally polarized wave) 12, a receiving device (horizontally polarized wave) 13, a transmitting device (vertically polarized wave) 14, a receiving device (vertically polarized wave) 15, a frequency conversion device 16, a signal processing device 17, a monitor control device 18, a data conversion device 19, a data display device 20, a data storage device 21, a data communication device 22, a remote monitor control device 23, and a remote display device 24.

The remote monitor control device 23 and the remote display device 24 are remotely provided from other devices provided in a radar site, and are used to remotely monitor and remotely control the system.

A monitor control signal for monitoring or controlling the system is transmitted from the remote monitor control device 23 to the monitor control device 18. The monitor control device 18 transmits a control signal to the signal processing device 17 in response to the monitor control signal. Further, the monitor control device 18 receives a monitor signal from the signal processing device 17 and transfers the received monitor signal to the remote monitor control device 23.

The signal processing device 17 outputs analogue transmission intermediate frequency (IF) signals of a horizontally polarized wave and a vertically polarized wave to the frequency conversion device 16 in response to the digital control signal from the monitor control device 18. The frequency conversion device 16 converts (up-converts) the transmission IF signal to a transmission radio frequency (RF) signal, and outputs the converted signal to the transmitting device 12 and the transmitting device 14.

The transmitting device 12 amplifies the transmission RF signal of the horizontally polarized wave to a transmission pulse wave of a horizontally polarized wave having a transmission power that can be observed from a far distance, and outputs the amplified signal to the antenna device 11. The transmitting device 14 amplifies the transmission RF signal of the vertically polarized wave to a transmission pulse wave of a vertically polarized wave having a transmission power that can be observed from a far distance, and outputs the amplified signal to the antenna device 11.

The horizontally polarized pulse and the vertically polarized pulse are radiated to the air from the antenna device 11, and are reflected by an observation target. The observation target in the weather radar system is precipitation particles existing in a predetermined valid reflective area, for example.

The reflected wave (received wave) from the observation target to the horizontally polarized pulse and the vertically polarized pulse is captured by the antenna device 11, and is received by the receiving device 13 and the receiving device 15. The receiving device 13 demodulates the received wave of the received horizontally polarized wave, and outputs a received RF signal to the frequency conversion device 16. The receiving device 15 demodulates the received wave of the received vertically polarized wave, and outputs a received RF signal to the frequency conversion device 16.

The frequency conversion device 16 frequency-converts (down-converts) the received RF signals of the horizontally polarized wave and the vertically polarized wave to received IF signals and output the received IF signals to the signal processing device 17.

The signal processing device 17 subjects the received IF signals output from the frequency conversion device 16 to necessary signal processing procedures, such as IQ detection, analogue-to-digital (A/D) conversion, received power calculation, interference wave removal, Doppler velocity calculation, and the like per pulse. Further, the signal processing device 17 detects the shape and size of the precipitation particles based on difference in reflective intensity between the horizontally polarized wave and the vertically polarized wave.

The signal processed data (precipitation intensity, Doppler velocity, shape of precipitation particles) digitally signal processed by the signal processing device 17 is output to the data conversion device 19. The data conversion device 19 analyzes the data based on the received power and the Doppler velocity calculated by the signal processing device 17. The data display device 20 is a display device, such as an LCD, and displays the data analyzed by the data conversion device 19. The data storage device 21 includes a storage device, such as a hard disc drive (HDD), and stores data analyzed by the data conversion device 19.

The data communication device 22 transfers the analyzed data to the remote display device 24 outside the radar site via a wireless or wired communication network, and displays data transferred from the data communication device 22.

Based on the data displayed on the remote display device 24, it is possible to analyze the radar site from a remote place, and monitor and control the radar site by means of the remote monitor control device 23.

Next, an interference wave removal process executed by the signal processing device 17 of the embodiment will be described.

Most of the conventionally-operated radars transmit horizontally polarized waves and capture reflected waves of the horizontally polarized waves. Accordingly, in the radars that transmits both horizontally and vertically polarized waves of the embodiment, interference waves of horizontally polarized waves may be mixed from already-operated radars (other stations), but interference of vertically polarized waves is considered to be unlikely to be mixed. Accordingly, if there is a big difference in level of reflected waves between the horizontally polarized wave and the vertically polarized wave, the effect of interference waves is regarded as being caused.

FIG. 2 is a block diagram illustrating a configuration of each unit relating to an interference wave removal process of the signal processing device 17. As shown in FIG. 2, the signal processing unit 17 includes an IQ detection unit (horizontally polarized wave) 171, a power calculation unit (horizontally polarized wave) 172, an IQ detection unit (vertically polarized wave) 173, a power calculation unit (vertically polarized wave) 174, an interference judgment unit 175, and an interference wave removal unit 176.

The IQ detection unit (horizontally polarized wave) 171 divides the received signal of the horizontally polarized wave into two paths, and quadrature-detect (IQ-detect) the reference intermediate frequency oscillation signals (COHO signals) offset from each other by 90 degrees. Thereby, in-phase (I) data ($I_H$ data) and quadrature (Q) data ($Q_H$ data) is generated per pulse hit. The generated $I_H$ data and the $Q_H$ data are A/D converted by an A/D conversion circuit (not shown) and output to the power calculation unit 172 of horizontally polarized wave.

The power calculation unit 172 calculates a received power of the horizontally polarized wave (horizontal polarization received power) of each pulse hit based on $I_H$ data and $Q_H$ data. The horizontal polarization received power $Pr_H$ (i) is calculated from I data $I_H$ (i) and Q data $Q_H$ (i) detected from a received signal of an ith hit (where i is an arbitrary integer), based on Formula (1) shown below. The received power $Pr_H$ (i) is usually expressed in decibel values.

$$Pr_H(i) = \sqrt{I_H(i)^2 + Q_H(i)^2} \tag{1}$$

The IQ detection unit (vertically polarized wave) 173 divides the received signals of the vertically polarized waves into two paths, and performs quadrature detection (IQ detection) using reference intermediate frequency oscillation signal (COHO signal) offset from each other by 90 degrees. Thereby, in-phase (I) data ($I_V$ data) and quadrature (Q) data ($Q_V$ data) are generated per pulse hit. The generated $I_V$ data and the $Q_V$ data are A/D converted by an A/D conversion circuit (not shown) and output to the power calculation unit 174 of vertically polarized wave.

The power calculation unit 174 calculates a received power of the vertically polarized wave (vertical polarization received power) of each pulse hit based on the $I_V$ data and the $Q_V$ data. The vertical polarization received power $Pr_V$ (i) is calculated from I data $I_V$ (i) and Q data $Q_V$ (i) detected from a received signal of an ith hit (where i is an arbitrary integer), based on the following formula (2). The received power $Pr_V$ (i) is usually expressed in decibel values.

$$Pr_V(i) = \sqrt{I_V(i)^2 + Q_V(i)^2} \tag{2}$$

The interference judgment unit 175 judges whether an interference wave is mixed into the received data of the ith hit, based on the horizontal polarization received power $Pr_H$ (i) calculated by the power calculation unit 172 and the vertical polarization received power $Pr_V$ (i) calculated by the power calculation unit 174. That is, when the value of the horizontal polarization received power $Pr_H$ (i) is extremely greater than the vertical polarization received power $Pr_V$ (i), it is judged that an interference wave is mixed.

When the interference judgment unit 175 has judged that an interference wave is mixed, the interference wave removal unit 176 performs a removal process of removing the effect of interference waves. For example, the interference wave removal unit 176 invalidates the horizontally polarized wave received data (I data $I_H$ (i), Q data $Q_H$ (i), and received power $Pr_H$ (i)) of an ith hit, into which interference waves have been mixed, and sets invalidated data such that it is not transferred to the following stages. The interference wave removal unit 176 may replace the received data of the horizontally polarized wave, into which interference waves have been mixed, with received data of the vertically polarized wave. Alternatively, the interference wave removal unit 176 may replace the received data of the horizontally polarized wave, into which interference waves have been mixed, with a mean value of received data of the horizontally polarized wave of hits before and after the received data.

Next, the procedure of the interference wave removal process of the signal processing device 17 with the above-described configuration will be described.

Figure 3:
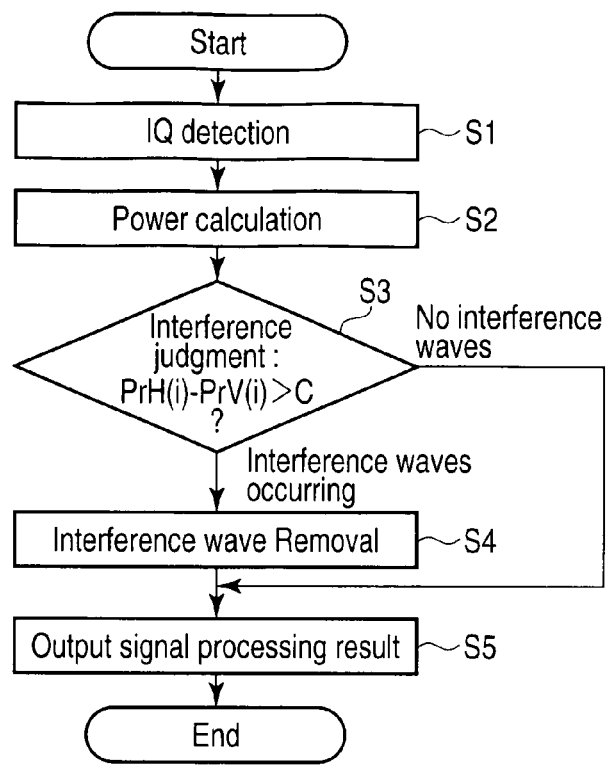
FIG. 3 is a flowchart illustrating an interference wave removal process of the embodiment.

FIG. 3 is a flowchart illustrating an interference wave removal process executed by the signal processing device 17.

First, the IQ detection unit 171 and the IQ detection unit 173 perform IQ detection on received IF signals of horizontally and vertically polarized waves inputted from the frequency conversion device 16, and generates $I_H$ data and $Q_H$ data of the horizontally polarized wave and $I_V$ data and $Q_V$ data of the vertically polarized wave (step S1).

Next, the power calculation unit 172 calculates a horizontal polarization received power $Pr_H(i)$ based on Formula (1), and the power calculation unit 174 calculates the vertical polarization received power $Pr_V(i)$ based on Formula (2) (step S2).

The interference judgment unit 175 judges whether an interference wave is mixed into the received data of an ith hit, based on the calculated horizontal polarization received power $Pr_H(i)$ and the vertical polarization received power $Pr_V(i)$ (step S3). More specifically, it is judged whether the difference between the horizontal polarization received power $Pr_H(i)$ and the vertical polarization received power $Pr_V(i)$, expressed in decibel values, is greater than a predetermined threshold value C.

The difference between the received powers expressed in decibel values represents the differential reflectivity factor $Z_{DR}$, as shown in Formula (3). The differential reflectivity factor $Z_{DR}$ represents the ratio of the reflectivity factor $Z_H(i)$ of the horizontally polarized wave and the reflectivity factor $Z_V(i)$ of the vertically polarized wave in decibel values. The reflectivity factor $Z_H(i)$ of the horizontally polarized wave is a product of the horizontal polarization received power $P_H(i)$ (given in watts [W]) and a predetermined coefficient, and the reflectivity factor $Z_V(i)$ of the vertically polarized wave is a product of a vertical polarization received power $P_V(i)$ (given in watts [W]) and a predetermined coefficient.

$$Z_{DR}(i) = 10\log\left(\frac{Z_H(i)}{Z_V(i)}\right) = 10\log\left(\frac{P_H(i)}{P_V(i)}\right) = Pr_H(i) - Pr_V(i) \quad (3)$$

That is, the differential reflectivity factor $Z_{DR}$ expresses the ratio between the horizontal polarization received power PH(i) and the vertical polarization received power $P_V(i)$ in decibel values.

When the value of the differential reflectivity factor $Z_{DR}$ is greater than the threshold value C, that is, when the value of the horizontally polarized wave received power $Pr_H(i)$ is greater than the vertical polarization received power $Pr_V(i)$, the interference judgment unit 175 judges that interference waves are mixed ("Interference occurring" in step S3). When the value of the differential reflectivity factor $Z_{DR}$ is equal to or below the threshold value C, the interference judgment unit 175 judges that interference waves are not mixed ("No interference" in step S3). The way to set the threshold value C will be described below.

When the interference judgment unit 175 has judged that interference waves may be mixed ("Interference occurring" in step S3), the interference wave removal unit 176 performs interference wave removal (step S4). The interference wave removal unit 176 invalidates the received data (I data $I_H(i)$, Q data $Q_H(i)$, and received power $Pr_H(i)$) of the horizontally polarized wave of an ith hit into which an interference wave is mixed, and sets them such that they are not transferred to the following stages.

The interference wave removal unit 176 may replace the horizontally polarized wave received power $Pr_H(i)$, into which an interference wave is mixed, with the vertical polarization received power $Pr_V(i)$. Alternatively, the interference wave removal unit 176 may replace the horizontally polarized wave received power $Pr_H(i)$ with a mean value of received powers of several hits before and after that. Similarly, the I data $I_H(i)$ of the horizontally polarized wave and Q data $Q_H(i)$ may be replaced with I data $I_V(i)$ and Q data $Q_V(i)$ of the vertically polarized wave.

The signal processing result of the horizontally and vertically polarized waves subjected to interference removal is output from the signal processing device 17 (step S5).

When the interference judgment unit 175 has judged that an interference wave is not mixed ("No interference" in step S3), the interference wave removal unit 176 does not perform interference wave removal, and the signal processing result of the horizontally and vertically polarized waves is output from the signal processing device 17 as it is (step S5).

Next, the way to set the threshold value C for the interference judgment (step S3 in FIG. 3) of the interference judgment unit 175 will be described.

Figure 4:
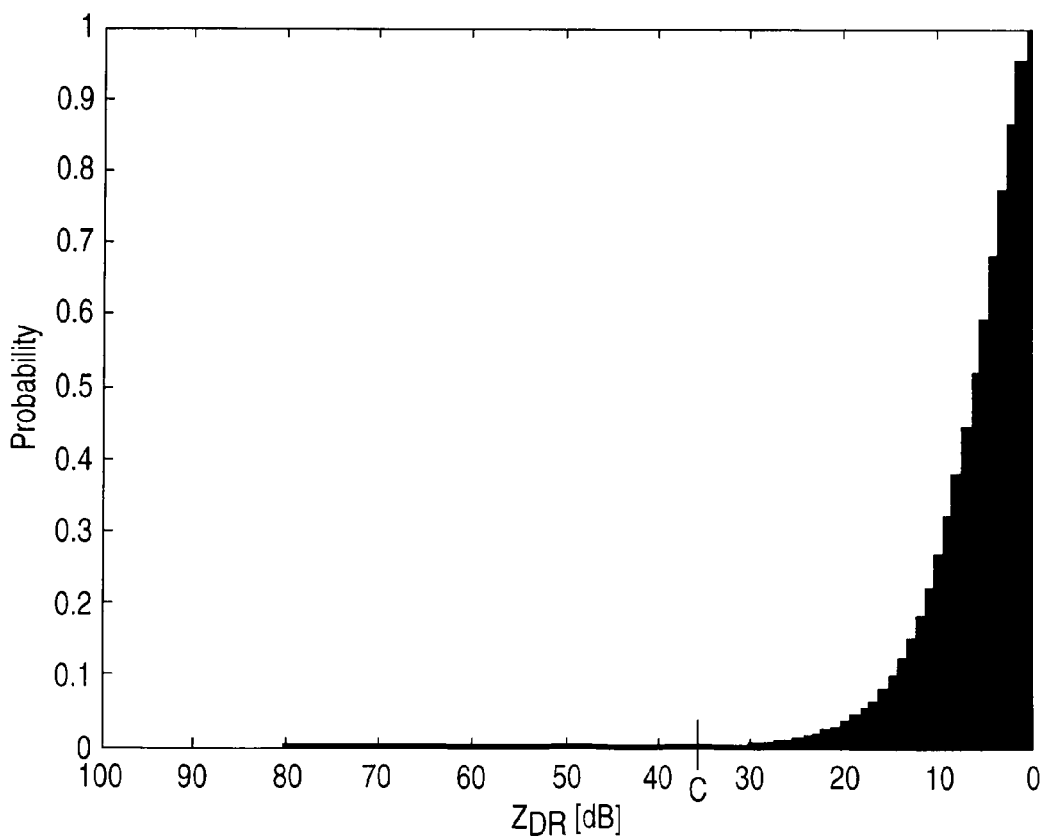
FIG. 4 illustrates statistical features of a differential reflectivity factor $Z_{DR}$.

FIG. 4 shows statistical features of the differential reflectivity factor $Z_{DR}$. In FIG. 4, the lateral axis denotes the decibel value of the differential reflectivity factor $Z_{DR}$, and the vertically axis denotes the detection probability of each differential reflectivity factor. In usual radars, the cross-polarized suppression ratio of the antenna device 11 is set to be equal to or greater than 40 dB. That is, when a horizontally polarized wave is received, the value of the vertical polarization received power $Pr_V(i)$ is suppressed by equal to or greater than 40 dB, compared to the horizontal polarization received power $Pr_H(i)$. In contrast, when a vertically polarized wave is received, the value of the horizontal polarization received power $Pr_H$ is suppressed by equal to or greater than 40 dB, compared to the vertical polarization received power $Pr_V(i)$.

Accordingly, the differential reflectivity factor $Z_{DR}$, indicating the difference between the horizontal polarization received power $Pr_H(i)$ and the vertical polarization received power $Pr_V(i)$ rarely becomes equal to or greater than 40 dB, as shown in FIG. 4. When the threshold value C is set in the vicinity of 40 dB, when the value of the differential reflectivity factor $Z_{DR}$ calculated by the interference judgment unit 175 is equal to or greater than the threshold value C, it can be judged that the horizontally polarized wave received wave receives an effect of an interference wave.

It is to be noted that the above-described way of determining the threshold value C is an example and the threshold value C may be determined by other ways.

As described above, according to the radar system of the embodiment, the interference judgment unit 175 is capable of judging whether the effect of interference waves is caused by the difference between the received powers of the horizontally polarized waves and the vertically polarized waves, with high precision. Further, when the effect of interference waves is caused, the interference wave removal unit 176 invalidates the received data such that it is not transmitted to the following stages. Moreover, the interference wave removal unit 176 can complement the received data that has received the effect of interference waves.

In the above-described embodiment, the received data of the horizontally polarized waves has been described as being effected by interference waves, when the received power of the horizontally polarized waves is extremely greater than the received power of the vertically polarized waves. However, when the other stations perform observation based on vertically polarized waves, instead of horizontally polarized waves, the received data of the vertically polarized wave may be judged as being effected by interference waves when the received power of the vertically polarized wave is extremely greater than the received power of the horizontally polarized wave.

In the above-described embodiment, the interference wave removal in weather radar for measuring precipitation amount, for example, has been described as an example. However, the above-described embodiment is applicable to other one-dimensional radars, such as airport monitor radars for detecting airplanes, for example.

In conventionally operated radars, observation is often performed merely by horizontally polarized waves, but it is difficult to provide a filter, for example, for interference wave removal in already operated radars. Accordingly, it is important to remove interference waves by performing signal processing in a newly provided radar system.

As described above, by removing the effect of electronic interference by means of signal processing, it is possible to enhance effective use of frequencies, such as dense frequency arrangement and reuse of the same frequency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A dual polarization radar apparatus, comprising:
a received power calculation unit configured to calculate a horizontal polarization received power and a vertical polarization received power, the horizontal polarization received power indicating a power value of a horizontal polarization received signal reflected from an observation target, the vertical polarization received power indicating a power value of a vertical polarization received signal reflected from the observation target;
a power ratio calculation unit configured to calculate a power ratio between the horizontal polarization received power and the vertical polarization received power; and
an interference judgment unit configured to judge that an interference signal is mixed to the horizontal polarization received signal or the vertical polarization received signal when the power ratio is greater than a predetermined threshold value.

2. The apparatus according to claim 1, wherein
the power ratio calculation unit calculates a power ratio of the horizontal polarization received power to the vertical polarization received power; and
the interference judgment unit judges that an interference signal is mixed to the horizontal polarization received signal when the power ratio is greater than a predetermined threshold value.

3. The apparatus according to claim 2, further comprising:
an interference wave removal unit configured to remove the horizontal polarization received power from the received data when the interference judgment unit has judged that an interference signal is mixed into the horizontal polarization received signal.

4. The apparatus according to claim 3, wherein the interference wave removal unit replaces the value of the horizontal polarization received power with the value of the vertical polarization received power.

5. The apparatus according to claim 3, wherein the interference wave removal unit replaces the value of the horizontal polarization received power with a mean value of horizontal polarization received powers of hits before and after the received signal.

6. The apparatus according to claim 1, wherein
the power ratio calculation unit calculates a power ratio of the vertical polarization received power to the horizontal polarization received power; and
the interference judgment unit judges that an interference signal is mixed into the vertical polarization received signal when the power ratio is greater than a predetermined threshold value.

7. The apparatus according to claim 6, further comprising:
an interference wave removal unit configured to remove the vertical polarization received power from received data when the interference judgment unit has judged that an interference signal is mixed into the vertical polarization received signal.

8. The apparatus according to claim 7, wherein the interference wave removal unit replaces the value of the vertical polarization received power with the value of the horizontal polarization received power.

9. The apparatus according to claim 7, wherein the interference wave removal unit replaces the value of the vertical polarization received power with a mean value of the vertical polarization received power of hits before and after the received signal.

10. An interference judgment method used in a dual polarization radar apparatus, the method being implemented in a signal processor, the method comprising:
calculating a horizontal polarization received power and a vertical polarization received power, the horizontal polarization received power indicating a power value of a horizontal polarization received signal reflected from an observation target, the vertical polarization received power indicating a power value of a vertical polarization received signal reflected from the observation target;
calculating a power ratio between the horizontal polarization received power and the vertical polarization received power; and
judging that an interference signal is mixed to the horizontal polarization received signal or the vertical polarization received signal when the power ratio is greater than a predetermined threshold value.

11. The method according to claim 10, wherein
in calculating, the power ratio is a power ratio of the horizontal polarization received power to the vertical polarization received power; and
in judging, it is judged that an interference signal is mixed to the horizontal polarization received signal when the power ratio is greater than a predetermined threshold value.

12. The method according to claim 11, further comprising:
removing the horizontal polarization received power from the received data when it has judged that an interference signal is mixed into the horizontal polarization received signal.

13. The method according to claim 12, wherein in removing, the value of the horizontal polarization received power is replaced with the value of the vertical polarization received power.

14. The method according to claim 12, wherein in removing, the value of the horizontal polarization received power is replaced with a mean value of horizontal polarization received powers of hits before and after the received signal.

15. The method according to claim 10, wherein
in calculating, the power ratio is a power ratio of the vertical polarization received power to the horizontal polarization received power; and in judging, it is judged that an interference signal is mixed into the vertical polarization received signal when the power ratio is greater than a predetermined threshold value.

16. The method according to claim 15, further comprising:

removing the vertical polarization received power from received data when it has judged that an interference signal is mixed into the vertical polarization received signal.

17. The method according to claim 16, wherein in removing, the value of the vertical polarization received power is replaced with the value of the horizontal polarization received power.

18. The method according to claim 16, wherein in removing, the value of the vertical polarization received power is replaced with a mean value of vertical polarization received powers of hits before and after the received signal.

* * * * *